United States Patent [19]
Biggar, III

[11] 4,413,541
[45] Nov. 8, 1983

[54] RAPID CHANGEOVER PRINTER

[75] Inventor: Frank M. Biggar, III, Lakeview, N.Y.

[73] Assignee: Elizabeth Short Biggar, Silver Creek, N.Y.

[21] Appl. No.: 379,484

[22] Filed: May 18, 1982

Related U.S. Application Data

[63] Continuation of Ser. No. 123,171, Mar. 10, 1980, abandoned, which is a continuation-in-part of Ser. No. 20,799, Mar. 15, 1979, abandoned.

[51] Int. Cl.³ .............................................. B26D 7/26
[52] U.S. Cl. ........................................ 83/346; 83/479; 83/481; 83/563; 29/568; 101/153; 101/247; 101/227
[58] Field of Search ................. 83/346, 479, 563, 481, 83/344; 101/153, 152, 247, 181; 29/568

[56] References Cited

U.S. PATENT DOCUMENTS

| 2,183,222 | 12/1939 | Luehrs | 101/153 |
| 2,746,386 | 5/1956 | Bamford | 101/153 |
| 3,503,293 | 3/1970 | Sander | 83/481 |
| 3,625,145 | 12/1971 | Heatley et al. | 101/152 |
| 3,800,648 | 4/1974 | Nishiyori et al. | 83/479 |
| 4,095,498 | 6/1978 | Biggar | 83/346 |
| 4,137,843 | 2/1979 | Ottenhue | 101/153 |
| 4,138,944 | 2/1979 | Biggar | 101/247 |

FOREIGN PATENT DOCUMENTS 1003887 9/1965 United Kingdom ............... 101/178

Primary Examiner—Donald R. Schran
Attorney, Agent, or Firm—Rogers, Eilers & Howell

[57] ABSTRACT

A compound printer having print stations, die cutting stations and other operations, such as perforating and punching, has structure for rapid changeover of the individual stations. Movable carriages on carriage bars and indexing mounts allow rapid removal and installation of the elements, such as the print station or the die. Changeover time is substantially reduced. Removed components may be stored on the carriages.

14 Claims, 23 Drawing Figures

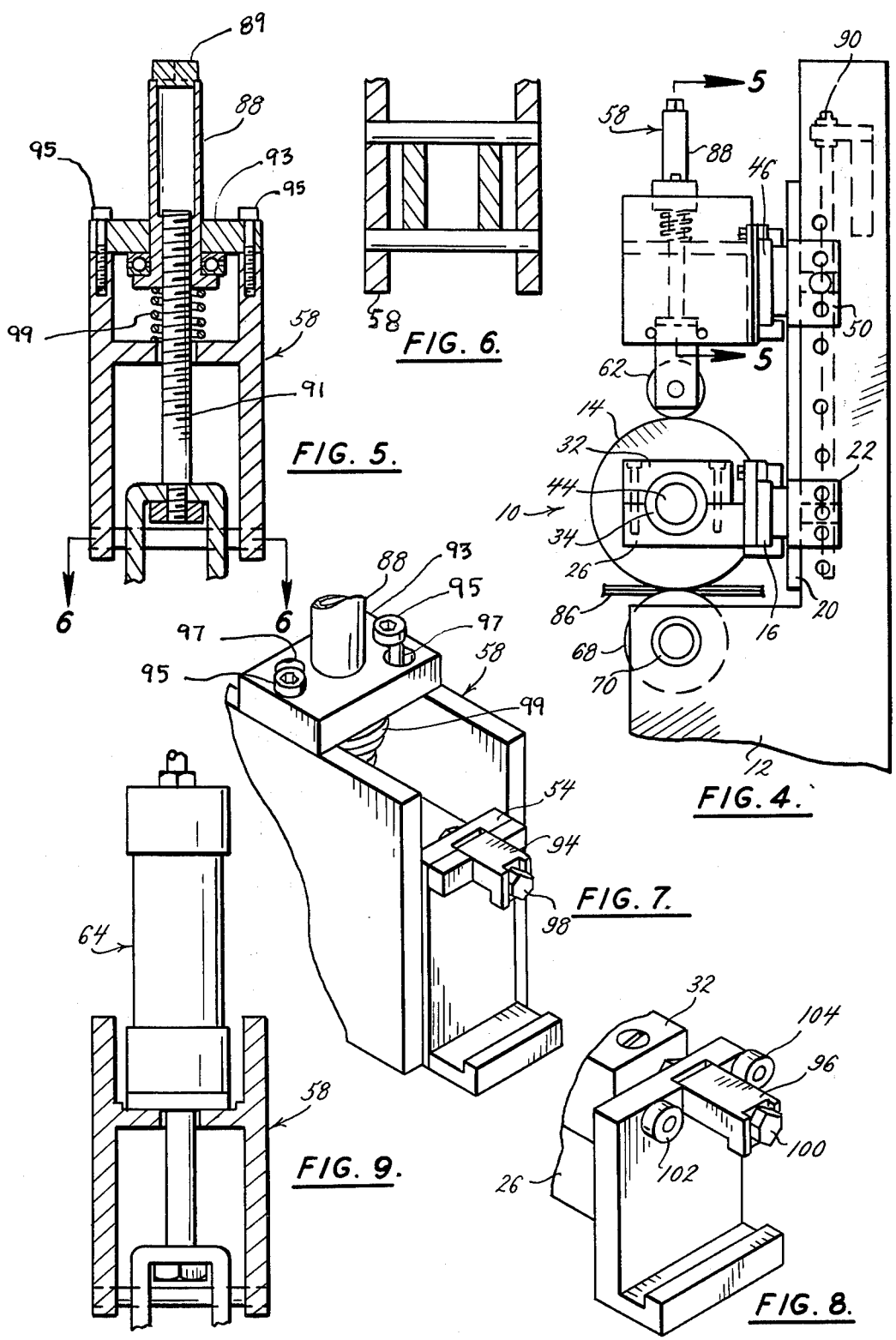

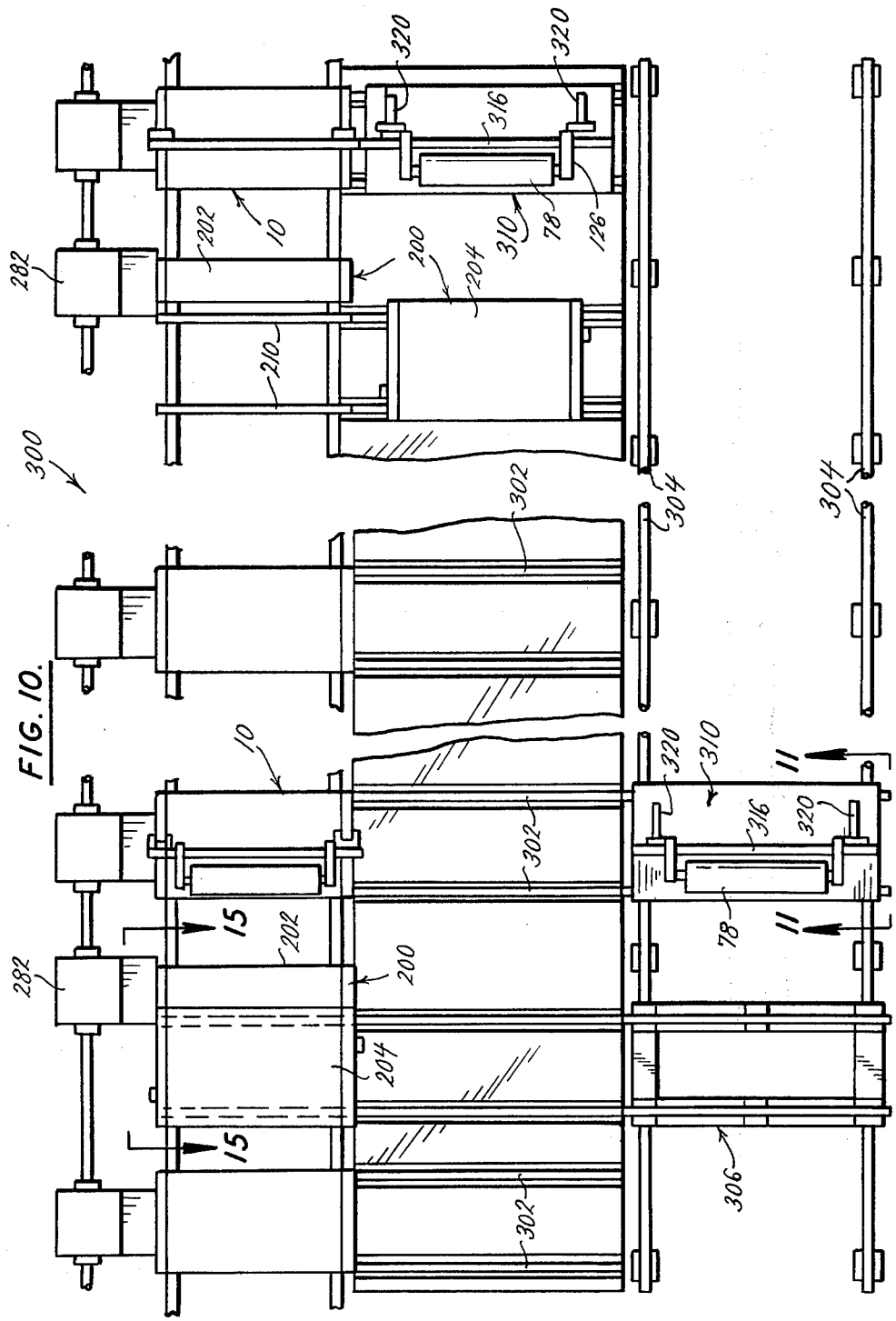

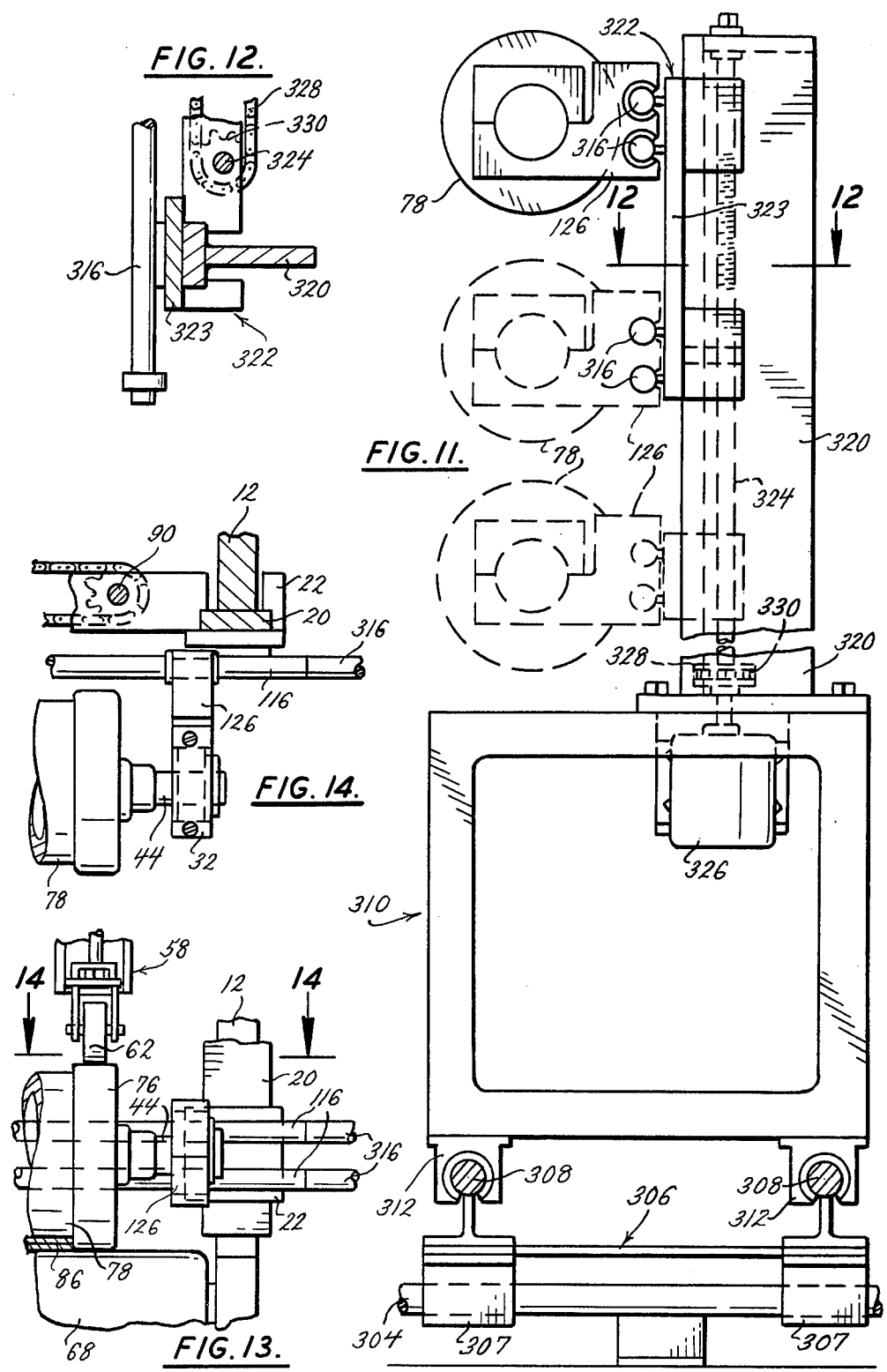

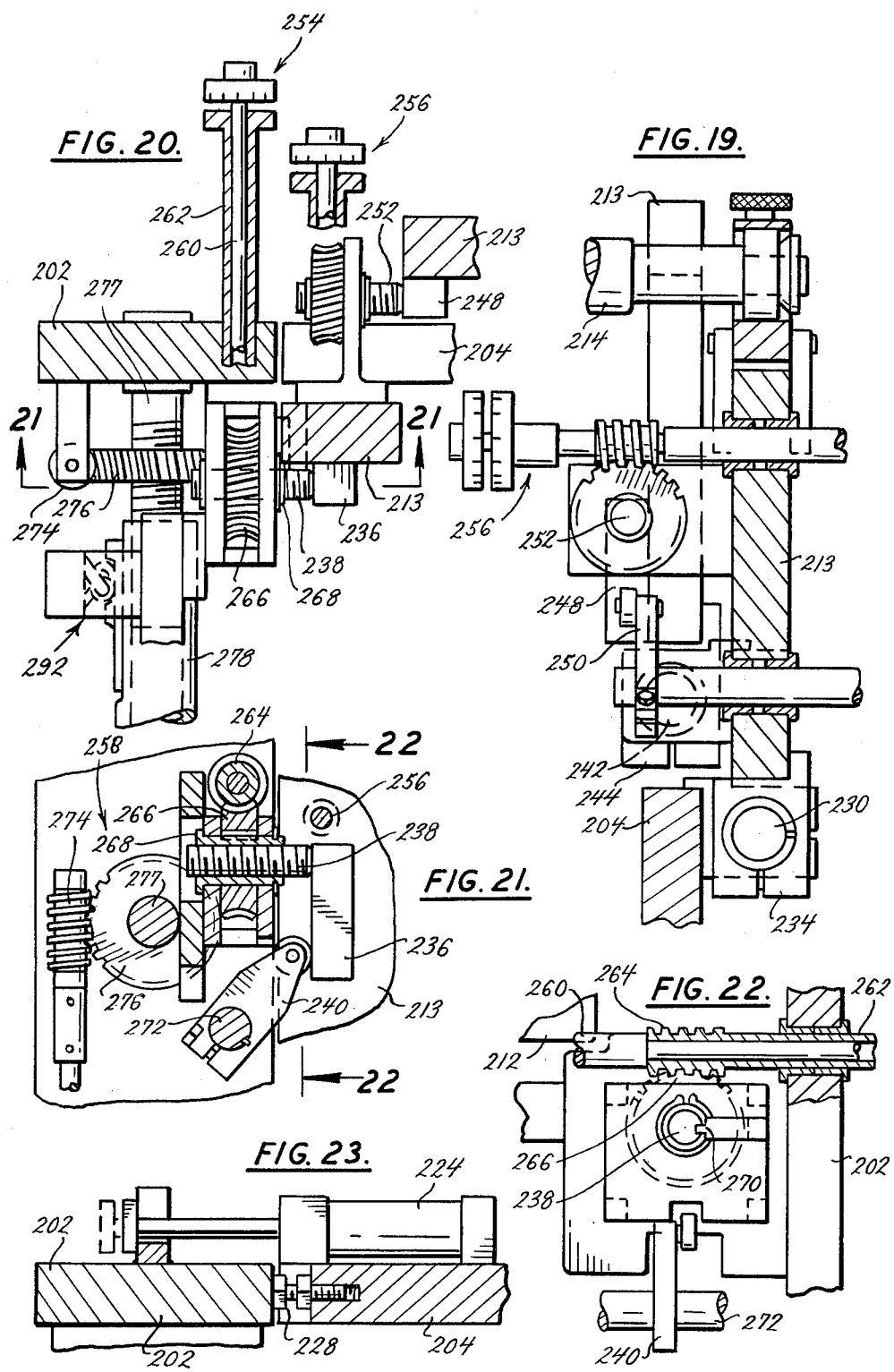

RAPID CHANGEOVER PRINTER

BACKGROUND AND SUMMARY OF THE INVENTION

This application is a continuation of application Ser. No. 123,171 filed Mar. 10, 1980, now abandoned, which is a continuation-in-part of U.S. patent application Ser. No. 20,799 filed Mar. 15, 1979, abandoned.

Rotary printing and die cutting of web products, e.g., to form adhesive labels, is disclosed in applicant's prior U.S. Pat. Nos. 4,095,498 and No. 4,138,944, the disclosures of which are incorporated by reference herein. In printing and die cutting labels, continuous webs of label material, bearing a pressure strippable material, are printed on a press and then die cut while passing through the nip of a rotating die and an anvil or pressure roll. The particular shape or pattern of the label is determined by the shape of the die. The labels are recovered by stripping away the undesired portion of the material.

Compound printers are expensive pieces of equipment. It is necessary, to recover the substantial investment in these machines, that they be operated with a maximum of productive time and a minimum of down time. It is desirable that the equipment be as versatile as possible to accommodate a variety of jobs with a minimum of equipment. The die cutting, punching and perforating equipment must be capable of accepting a variety of configurations, that is, it must accept a variety of web sizes, and die sizes. The print module must be capable of handling various web sizes and of printing a variety of shapes and colors. It is preferable that the printer be capable of multiple color printing, which requires more than one print station. The total compound printer must process jobs of a variety of shapes, sizes and colors. Moreover, the total equipment must be capable of operating at high speeds and must produce large quantities of product in a short time.

Applicant's prior U.S. Pat. No. 4,095,498 and U.S. Pat. No. 4,138,944 disclose printing modules and die cutting modules which may be used in compound printing operations. Previous U.S. Pat. No. 3,491,641; U.S. Pat. No. 3,826,165; U.S. Pat. No. 3,850,059; U.S. Pat. No. 3,348,477; U.S. Pat. No. 3,832,925; U.S. Pat. No. 3,866,497 and U.S. Pat. No. 3,872,752 also disclose web processing structures. The disclosures of all of the above patents are incorporated by reference herein.

Prior devices do not prevent a substantial loss of time due to changeover of the process line to accept a different job configuration, such as a different die size, a different color or colors of print or other change in the job. Much of the time is lost in clean up and set up of the job, which in previous machines must occur on line. For example, to change ink color in current machines the ink fountain and rolls must be cleaned on the machine. The old ink must be removed, the reservoir and fountain completely cleaned, the fountain roll, anilox roll and plate cylinder must be completely cleaned, the reservoir and fountain must be refilled with ink before printing can be resumed. This process can consume anywhere from one to four hours, depending on the complexity of the equipment. If more than one color is involved, more time may be involved in the changeover.

Similarly, if a different die is required during a job, a great deal of down time is required in changeover, since the die support structure must be changed in line. The die must be removed by hand and replaced.

Applicant has now discovered and provided structure to save a great deal of time and expense in changeover. Process changes may be set up off line and rapidly introduced into the printer and production may be resumed. The changeover time is extremely small and can be accomplished by the operator in a matter of minutes for each element of the process which is changed. Clean up of the replaced elements may be conducted off line. The removed elements can then be set up for subsequent replacement and use or placed in storage until such time as an additional change in the printing process is required.

DESCRIPTION OF THE DRAWINGS

FIG. 4 is a side view of the die cutting station shown in FIG. 1;

FIG. 5 is a sectional view taken along the plane of line 5—5 in FIG. 4;

FIG. 6 is a partial sectional view taken along the plane of line 6—6 in FIG. 5;

FIG. 7 is a partial isometric view of the pressure wheel assembly and slide;

FIG. 8 is a partial isometric view of the die cylinder bearing block and slide;

FIG. 9 is an alternate pressure device for the pressure wheel assembly;

FIG. 10 is a plan view, in schematic, of a compound printing line using the apparatus of the invention;

FIG. 11 is a partial sectional view taken along the plane 11—11 in FIG. 10, showing applicant's die transfer carriage;

FIG. 12 is a partial sectional view taken along the plane 12—12 in FIG 11;

FIG. 13 is a partial view of applicant's die station 10 and transfer cart 310;

FIG. 14 is a partial sectional view taken along the plane 14—14 in FIG. 13;

FIG. 19 is a partial sectional view taken along the plane 19—19 in FIG. 18;

FIG. 20 is a partial sectional view taken along the plane 20—20 in FIG. 18;

FIG. 21 is a partial sectional view taken along the plane 21—21 in FIG. 20;

FIG. 22 is a partial sectional view taken along the plane 22—22 in FIG. 21; and

FIG. 23 is a partial top view of the print module showing the air cylinder and yoke on the operator's side.

DESCRIPTION OF THE PREFERRED EMBODIMENT

Figure 1:
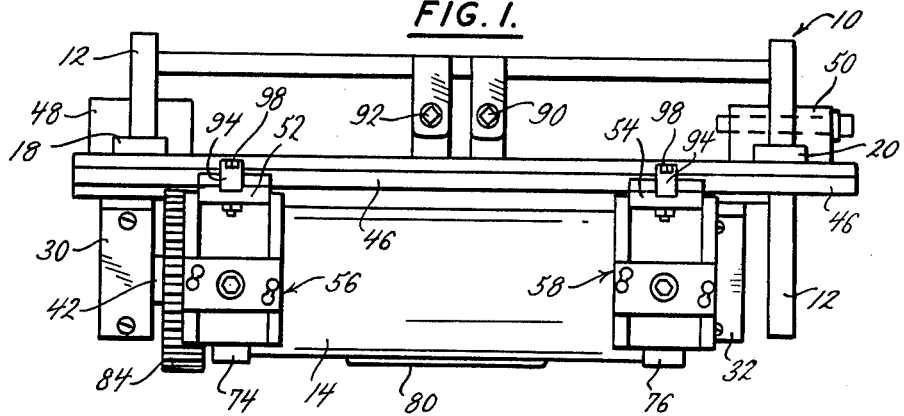
FIG. 1 is a partial top plan view of a die cutting station using the structure of the invention.
Figure 2:
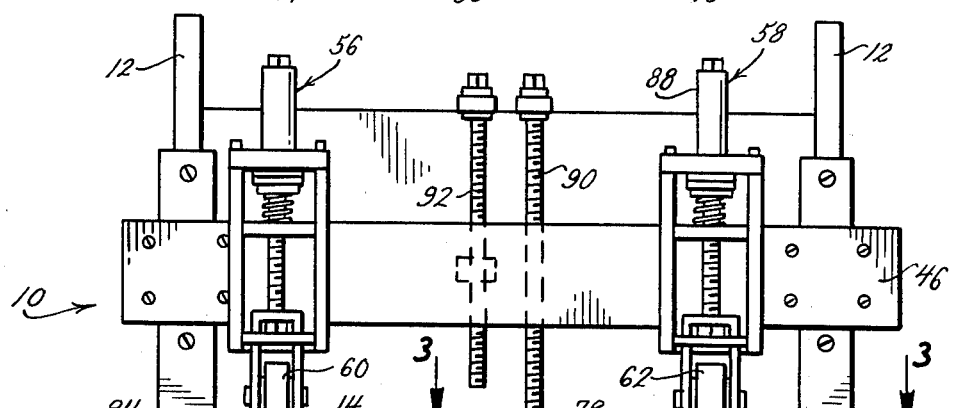
FIG. 2 is a partial front view of the die cutting station shown in FIG. 1.
Figure 3:
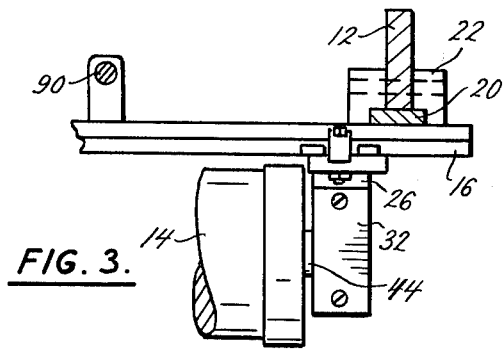
FIG. 3 is a partial sectional view taken along the plane of line 3—3 in FIG. 2.

Referring in more detail to FIG. 2, a die cutting station 10 is shown with a frame 12 in which is mounted a die cylinder 14. Die cylinder 14 is mounted on a cross bar which is positioned between a pair of uprights 18 and 20, which are part of frame 12, and extend upwardly therefrom. Cross bar 16 is mounted at each end in receiving blocks 22 on uprights 18 and 20. Receiving blocks 22 have a C-shaped cross section, as shown in FIG. 3, which cooperates with uprights 18 and 20. The receiving blocks 22 are freely slidable in the vertical direction along uprights 18 and 20. Cross bar 16, mounted on receiving blocks 22, is freely slidable with receiving blocks 22.

Supported on cross bar 16 are two bearing blocks 26 and 28, shown in FIGS. 2 and 3. Bearing blocks 26 and 28 are freely slidable in a horizontal direction along cross bar 16. Bearing blocks 26 and 28 are split and have removable caps 30 and 32, as shown in FIGS. 2 and 8. The bearing blocks 26, 28 support bearings 34 on the ends of shafts 42 and 44 of the die cutting cylinder 14.

Above cross bar 16 is a second cross bar 46 which is similar in design and cross section to cross bar 16 and is also mounted on receiving blocks 48 and 50, which are slidable on vertical supports 18 and 20, but which can be fixed, if desired. Slidably received on cross bar 46 are support blocks 52 and 54 which slide horizontally along cross bar 46. Mounted on each of blocks 52 and 54 is a pressure wheel assembly 56, 58. Assemblies 56, 58 have smooth machined wheels 60, 62 of steel or similar smooth hard material, which can be reciprocated in a vertical direction. Slidable supports 26, 28, 48, 50, 52 and 54 can be locked in any chosen position by set screws, bolts, pins, cams or any other conventional latch, if desired, as explained herein. Cross bars 16 and 46 can be positioned by lead screws 90 and 92 as shown, or by other equivalent means, or the cross bars can be free floating. In FIG. 2, lead screws 90 and 92 are shown as being single, center mounted screws. It will be appreciated, however, that either or both of them may be made plural and spaced from the center. The latter structure assisting in maintaining the horizontal orientation of cross bar 16 and/or cross bar 46.

An anvil or pressure cylinder 68 is mounted below die cylinder 14 in bearings 70, which may be split, or which may be solid and removable from the frame 12 with anvil cylinder 68. Die cylinder 14 contacts pressure cylinder 68 at circumferential lands 74, 76 which are higher than the central portion 78 of the die cylinder. Typically, there is a clearance of approximately 0.002 inches between portion 78 and the pressure cylinder, or less than the thickness of the workpiece, depending on the thickness of the carrier sheet. A clearance of 0.002 inches is normally used where the carrier sheet is 0.003 inches thick, a normal thickness. Clearance can be greater or less depending on the particular job. Zero tolerance cutting, e.g., 0.0001 inches tolerance, may be used for cutting single sheets, as is known in the art. Mounted on portion 78 of die cylinder 14 is a die 80 which may be a machined die, a chemically milled die or other types as is known in the art. The die extends outwardly beyond the profile of portion 78 of the die cylinder. There is a slight clearance between the die and the pressure cylinder to avoid cutting entirely through the web 86 being processed, as is known in the art.

The gear train 82, 84, a chain drive timing belt or other conventional mechanism rotates the anvil 68, the die cutting cylinder 14 and drives the web or workpiece 86 in a manner known in the art.

Pressure wheel assemblies 56 and 58, as shown in FIGS. 2, 4, 5 and 7, have spring loaded mechanically adjustable devices 88 for applying force through pressure wheels 60 and 62 to the lands 74 and 76 of die cylinder 14. It will be appreciated, however, that instead of mechanical screws, hydropneumatic cylinders 64, as shown in FIG. 9, could be used to apply force to pressure wheels 60 and 62, as could vacuum-hydraulic cylinders and other comparable devices. It will be appreciated that cylinder 64 would preferably be of the double acting type so that the pressure wheels could be extended during die cutting to contact and apply force to lands 74, 76 of the die cylinder 14 and then later be withdrawn when the pressure circuit is reversed. This system offers the advantage that when the process is interrupted by a broken web or change of the die cylinder and die, the machine can be restarted and the cylinders re-engaged without adjusting the pressure setting.

Referring in more detail to FIGS. 5 and 7, the mechanical adjustable devices 88 also include a quick release feature. Force is applied to or released from lands 74 and 76 by threaded adjust bolts 89 which thread over shafts 91 of pressure wheels 60 and 62. As shown in FIG. 5, adjust bolt 89 is retained in the pressure wheel assembly 58 by yoke 93 bolted to the top of pressure wheel assembly 58 by bolts 95, as shown. Yoke 93 has two slotted holes 97 through which bolts 95 pass, as shown. Spring 99 biases yoke 93, adjust bolt 89, shaft 91 and pressure wheel 62 in an upward direction against bolts 95. To quickly release mechanical device 88, adjust bolt 89 is rotated to telescope with threaded shaft 91 to relieve the contact force between pressure wheel 62 and land 76. With the force relieved, yoke 93 can be rotated (counterclockwise in FIG. 7) to a position with bolts 95 passing through the back portion of slotted holes 97. The back portions of slotted holes 97 are larger than the heads of bolts 95, as shown. Spring 99 then lifts pressure wheel 62, bolt 89 and shaft 91 to give sufficient clearance between pressure wheel 62 and die cylinder 14; normally two inches is sufficient clearance. Force can be re-exerted by reversing the above procedure. Spring 99 is compressed and yoke 93 is rotated to re-engage bolts 95. Adjust bolt 89 can then be rotated to re-exert force through pressure wheel 62. The adjustment required through adjust bolt 89 is normally small and the adjustment procedure can be rapidly completed.

Whichever means of applying force is used, it will be appreciated that normally the total force that is supplied is from about 2,500 to 3,000 pounds force which is usually 100 to 200 pounds of force per lineal inch of the cutting edge of die 80. As the die 80 becomes blunter with use, the force applied to the die cylinder 14 can be increased to ensure proper cutting.

Bearing blocks 26 and 28 for die cylinder 14 and support blocks 52 and 54 for pressure wheel assemblies 56 and 58 preferably are fastened in position by clamps 94 and 96, shown in FIGS. 7 and 8. Clamps 94 and 96 operate by tightening bolts 98 and 100 to secure the clamp against the respective support 16 or 46 to fix the position of support blocks 52 and 54 and bearing blocks 26 and 28 thereon.

Of particular importance to bearing support blocks 26 and 28 are roller bearings 102 and 104 which are mounted thereon. Roller bearings 102 and 104 allow bearing supports 26 and 28 to be moved horizontally on support 16 when latches 96 are released, even when a heavy die cylinder 14 is mounted therein. This allows a die cylinder 14 to be moved horizontally out of engagement with an anvil 68 and out of engagement with a workpiece or web 86 and clear of the pressure wheel assemblies 56 and 58. When moved horizontally away from engagement with the web or clear of the pressure wheel assemblies, the die cylinder can then be rapidly removed, replaced or reversed in the bearing blocks 26 and 28, as described herein.

Support blocks 52 and 54 may also be equipped with rollers, if desired. Usually the pressure assemblies 56 and 58 will be light enough for manual positioning without rollers on support blocks 52 and 54.

Figure 15:
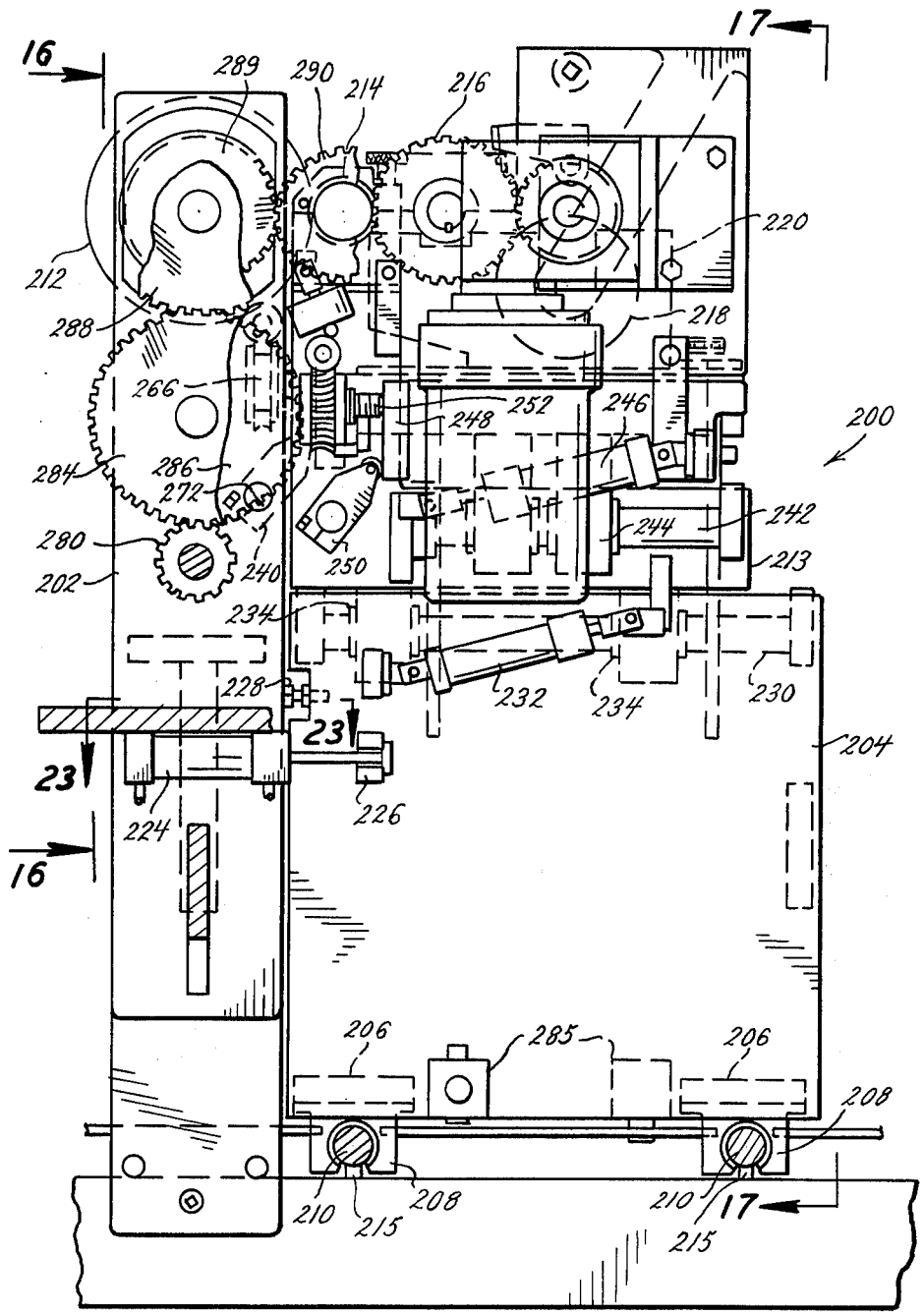
FIG. 15 is a partial sectional view taken along the plane 15—15 in FIG. 10 showing applicant's print module.

Referring to the embodiment shown in FIGS. 13 and 14, a modification in the die station 10 is shown in which cross bar 16 is replaced by a pair of spaced machined rods 116 (Thompson bars). Sliding support blocks 126 are adapted to receive rods 116 therein and to slide thereon. It is preferred that blocks 126 be sliding pillow block bearing assemblies of the recirculating ball type, for example, a structure similar to Thompson Industries, Manhasset, N.Y., model SPB-24-OPN Super Pillow Block (TM), is preferred. Other equivalent bearing structures may be used. It will be appreciated that the backs of blocks 126 are open to allow the support for rods 116 to pass through the blocks 126, as shown in FIG. 15, herein. Rods 116 are mounted on receiving blocks 22 which operate in the manner previously described.

Referring to FIGS. 15-22, a print station 200 is shown having an impression cylinder 212 mounted in a frame 202. A sub-frame 204, as part of the print station, is mounted in frame 202, as shown. Sub-frame 204 is mounted on parallel plates 206 which extend transversely across the compound printer. Plates 206 are mounted on recirculating ball pillow blocks 208 of the type previously disclosed. Pillow blocks 208 are engaged on transversely extending polished bars 210 which are mounted to the floor beneath the printing line by mounts 215, as shown.

The impression cylinder 212 is mounted in the main frame 202, as shown. Sub-frame 204 supports an L-shaped upper mounting assembly 213, as shown, in which the plate cylinder 214, the Anilox roll 216 and the fountain roll 218 are rotatably mounted, as shown. It will be appreciated that all these rollers will be supplied with suitable drive mechanism, as is known in the art and as shown herein. Fountain roll 218 extends down into ink fountain 220, which is mounted in the upper mount assembly 213. The fountain 220 may be supplied from an external reservoir, not shown, as is known in the art. As shown, the fountain 220 may be mounted on an elevator assembly which may be driven to raise or lower the fountain to maintain a uniform contact between the fountain roll and the ink, as is known in the art. In addition, the Anilox roll may have a suitable doctor blade, as shown, to maintain an even distribution of ink on the Anilox roll during printing.

The main frame 202 and sub-frame 204 are equipped with a pair of cooperating air cylinders and yokes 224 and 226 which may be engaged to connect the main frame 202 to sub-frame 204. On the gear drive side of the printing line the cylinder 224 is mounted on the main frame 202 and yoke 226 is mounted on sub-frame 204, as shown in FIG. 5. On the operator's side of the printing line, yoke 226 is mounted on main frame 202 and cylinder 224 is mounted on sub-frame 204, as shown in FIG. 23. As also shown in FIG. 23, the sub-frame 204 and main frame 202 have an adjustable stop 228 which positions the sub-frame 204 against frame 202 when the cylinders and yokes 224, 226 are engaged.

L-shaped mount 213 is supported on longitudinally extending bars 320. Mount 213 is reciprocated on the bars 230 by a set of air cylinders 232, mounted as shown. Recirculating ball slides 234 allow reciprocation of L-shaped mount 213 along bars 230. The L-shaped mount 213 has a pair of stop blocks 236 as shown which abut against paired adjustable screw stops 238 and movable cam stops 240, as shown. Within mount 213 is a second set of longitudinally extending bars 242 on which the ink fountain and Anilox roll are mounted by reciprocating ball slides 244. The ink fountain 220 and Anilox roll assembly 216 are reciprocated along bars 242 by paired pneumatic cylinders 246, mounted as shown.

The combined Anilox roll 216 and fountain 220 assembly also has paired stop blocks 248 and cam stops 250, as shown, and paired adjustable screws stops 252. Screw stops 252, 238 and cam stops 240 and 250 are mounted on the main frame 202 and sub-frame 213, as shown. Stop blocks 236 and 248 are mounted with the assemblies in sub-frame 204, all as shown.

Paired screw stops assemblies 238 and 252 are selectively adjustable by operation of shaft within a shaft worm and gear adjusters 254, 256 which may selectively adjust individual members of the paired screw stops or may adjust both members of the pair simultaneously, by individual or joint operation of the shaft within shafts.

This operation allows fine adjustment of the contact between the plate roll 214 and impression cylinder 212 and between the Anilox roll 216 and plate cylinder 214 to increase or decrease the contact or to skew the contact as will be described herein.

The detail of the screw stop 238 and cam 240 indexing mechanism is further shown in FIG. 21 which shows the mechanism of 238 and 240. It will be appreciated that the the mechanism 250 and 252 is the same.

Screw adjust assembly 254 is driven by a shaft 260 within a shaft 262. Outer shaft 262, operating through a worm and gear combination 264, 266, reciprocates screw 238, on the operator's side of the print line, through bushing 268. Screw 238 is captured from rotation by key 270, as shown in FIG. 22. Inner shaft 260 operates screw 238 on the gear drive side of the print line by a similar worm, gear and bushing arrangement. Paired rotating cams 240 operated by rotating shaft 272, and paired rotating cams 250, impinge against spacing blocks 236, 248, respectively, mounted on each side of the print line in sub-frame 204 and in L-frame 213, as shown.

The print module 200 may also be provided with a helical gear lash adjustment 258 which adjusts the relationship between the circumferential impression cylinder 212 and the plate pressure cylinder 214 to adjust the register of the print on web 86 passing through the nip of impression cylinder 212 and plate cylinder 214. The lash adjustment mechanism may be servo operated or may be manually operated.

Figure 16:
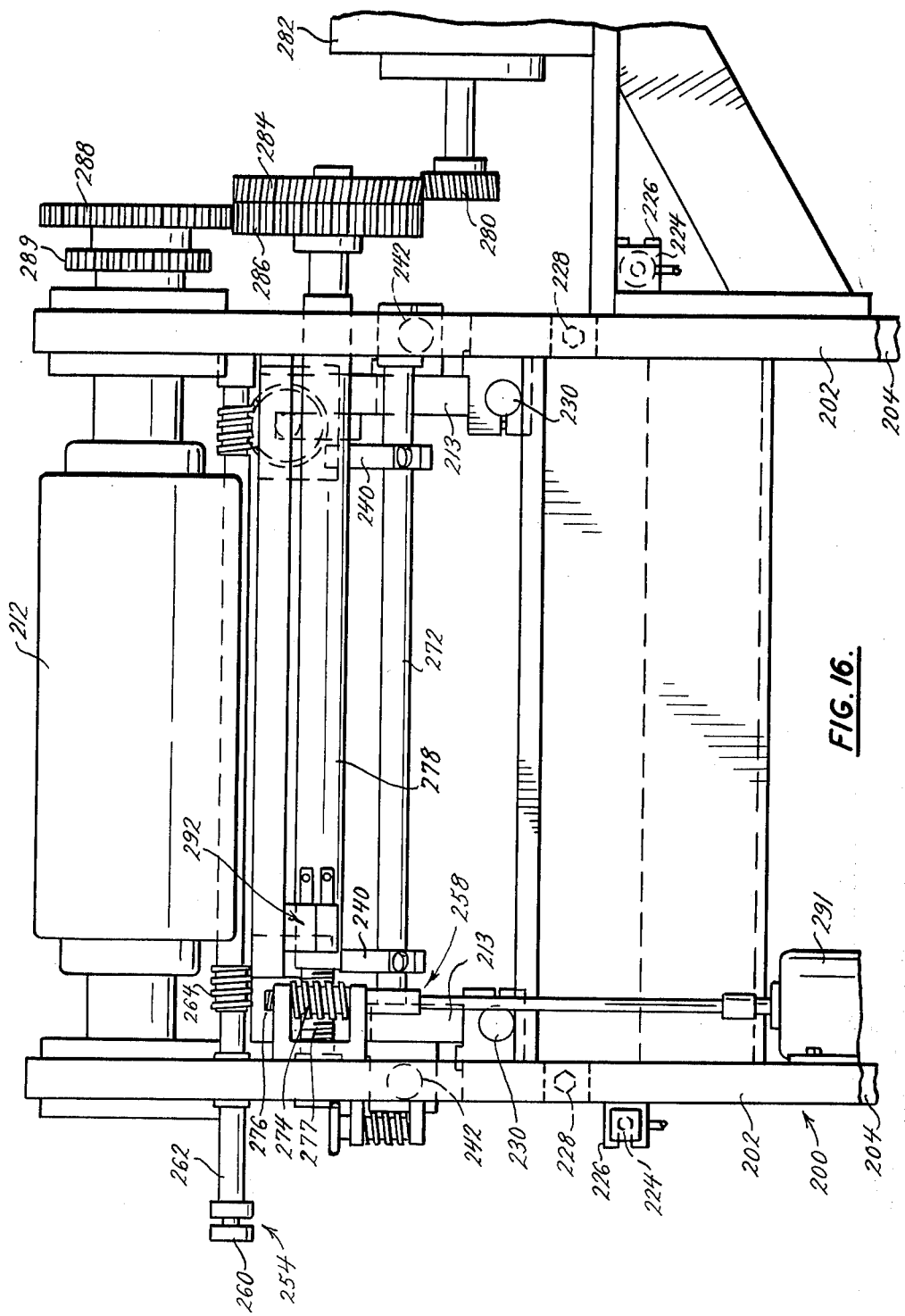
FIG. 16 is a partial sectional view taken along the plane 16—16 in FIG. 15.
Figure 17:
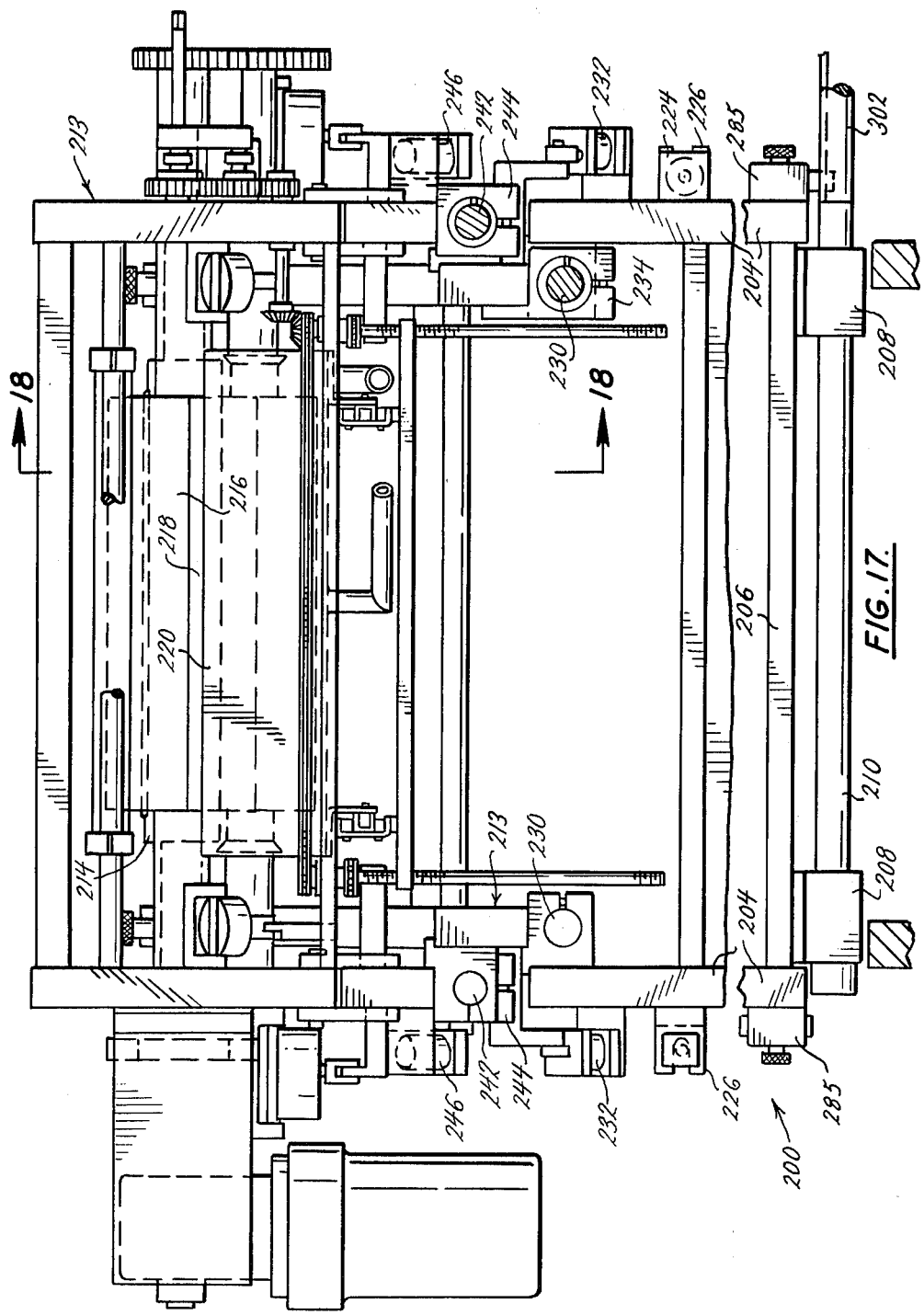
FIG. 17 is a partial sectional view taken along the plane 17—17 in FIG. 15.
Figure 18:
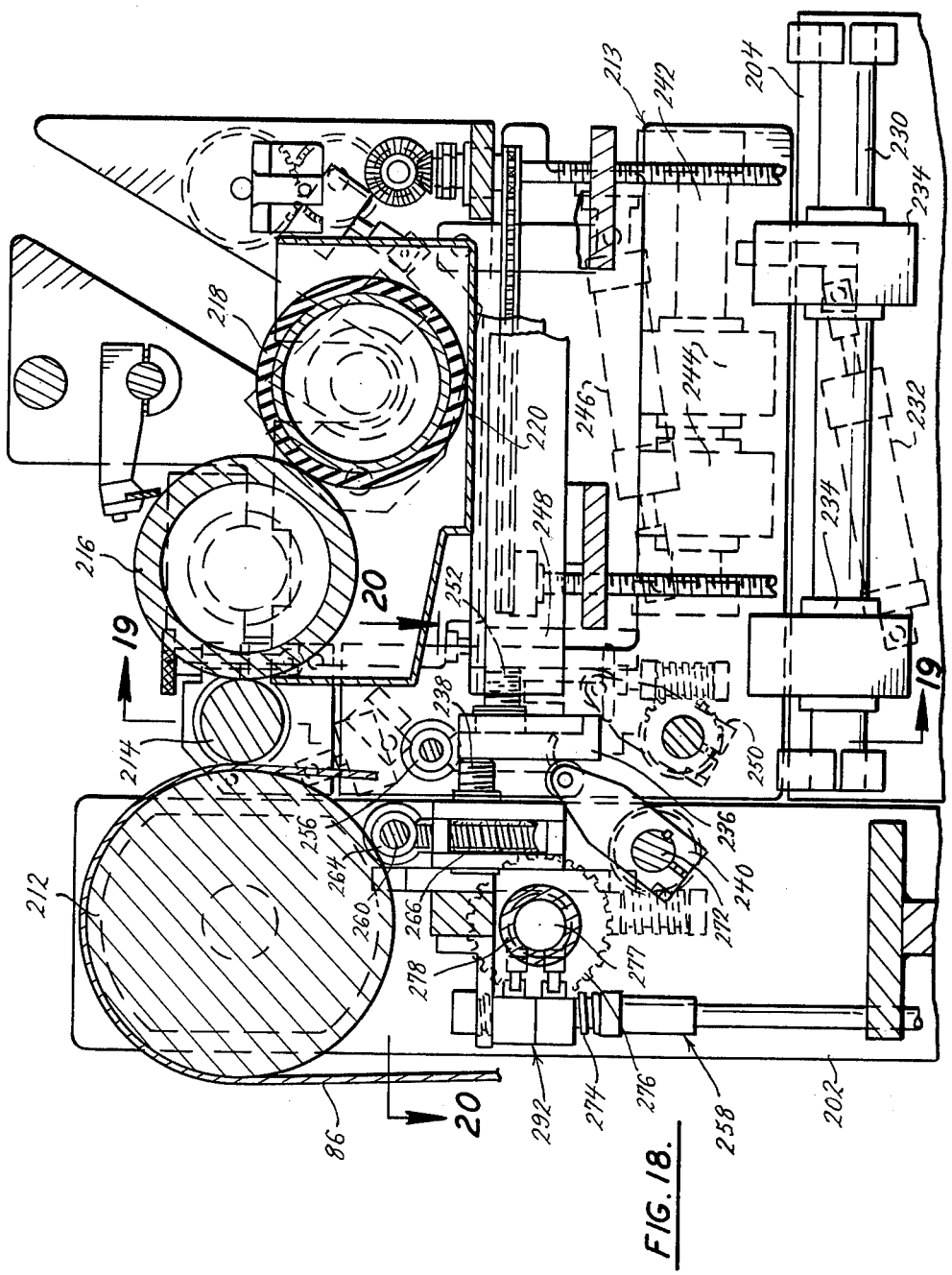
FIG. 18 is a partial sectional view taken along the plane 18—18 in FIG. 17.

The print registry adjust mechanism 258, shown in FIGS. 16 and 18 as being servo motor driven, operates through a worm and gear mechanism 274, 276 to rotate a threaded collar 277 on phasing shaft 278. Rotation of collar 277 reciprocates shaft 278 transversely in the print module 200. Shaft 278 is driven by a helical gear 280 connected to gear box 282. Helical gear 280 meshes with helical gear 284 on phasing shaft 278 and is paired with spur gear 286 which drives spur gear 288 that rotates impression cylinder 212. As the phasing shaft is reciprocated, the relative placement of the spur gears 280, 284 are changed, causing a small relative rotation and change of phasing between the gears 284, 286 and gear 288 driving impression cylinder 212. This change of phase is transferred with the opposite sign to the print cylinder 214, which is driven through gear 289 meshing with gear 290, which drives the plate cylinder 214. If the phasing system is operated by a servo motor 291 as shown, motor 291 may be equipped with a suitable switching mechanism 292, microswitches operated by cams, or other structure known in the art, which centers the phasing mechanism to a pull location each time the print module is changed, as described further herein.

Referring now to FIG. 10, a compound printing line 300 is shown having a plurality of web processing stations including a printing station 200 and die cutting stations 10, as shown. The printing line 300 may have a plurality of printing stations 200 and may have other web processing stations including punching, perforating, roll feeding, tractor rolls and winding rolls in plural or single operation, as may be required by the particular operation.

Extending transversely from the operations or stations in print line 300 are paired machined bars 302. Extending parallel to the printing line is paired machined bars 304. Bars 302 and 304 are supported above the floor by supports 305. Bars 302 are spaced above bars 304 as shown in FIG. 11. Decking may be supplied around bars 302 and 304 to provide a uniform surface for walking.

Mounted on bars 304 are a plurality of platforms or carts 306 which are equipped with recirculating ball bearing blocks 307, of the open type previously described, which allow movement of carts 306 along bars 304. Carts 306 are equipped with Thompson bars 308 which extend parallel to transverse bars 302 and can be placed adjacent to and in communication with bars 302 in an abutting relationship. Also mounted on a cart 306 is a transfer frame or cart 310 shown in more detail in FIG. 11. Cart 310 is also mounted on open pillow blocks 312, of the recirculating ball type. Extending upwardly are two spaced uprights in the form of T-bars 320. Mounted on T-bars 320 is a framework 322 having two vertical members 323 slidingly received on T-bars 320, as shown in FIGS. 11 and 12, and having mounted thereon two spaced sets of polished bars 316, as shown. Bars 316 are mounted and spaced to mate up with bars 116 of die station 10 when placed adjacent thereto as shown in FIG. 14. Lead screws 324 driven by a motor 326 and chain and gear sets 328, 330 reciprocate vertical members 323, and attached bars 316 vertically along vertical members 320.

OPERATION OF THE DEVICE

In operation of the device, a travelling web of paper such as a multi-laminar web 86 passes through the print station 200, shown in FIG. 18 and between the nip of the anvil 68 and the die cylinder 14 of die station 10, shown in FIG. 4. In the die station 10, the land portions 74, 76 are in direct contact with anvil 68. The web 86 passes between land 74, 76 and is contacted by die 80 which cuts partially through the multiple layers of paper as shown. Clamps 96 are fixed to prevent horizontal movement of the die cylinder 14. Pressure assemblies 56 and 58 are positioned over land 74, 76 of die cylinder 14 with pressure wheels 60 and 62 in contact therewith, as shown. Clamps 94 are fixed to prevent horizontal movement of pressure assemblies 56 and 58.

In use of the compound printer, it eventually becomes necessary to change and to replace web 86 with a different width, size or style of web or to replace die 80 with a different die. It may also be necessary to change the color of the ink in fountain 220 to prepare the printer for a different colored job. It may also be necessary to change the print cylinder or to make other changes in the printing operation.

With applicant's device, it is possible to make rapid changeovers in the printing operation with a minimum of time loss. For the most part changeover is conducted by setting up the change off line while the printing machine continues to operate. Set up can be essentially complete before stopping production. Once production is stopped, the changes can be rapidly introduced into the printing line and production resumed. For example, in changing the die 80 on die cutting cylinder 14, a replacement die cylinder 14 having a die 80 thereon is first mounted in bearing blocks 32 in the upper position on transverse bars 316 mounted on vertical support 323 of die transfer cart 310. This is conducted off line while the printing operation continues. When die cylinder 14 is mounted on cart 310, the cart 310, on cart 306 is then transferred along bars 304 to a position parallel to the die cutting station 10. The cart 310 is then transferred along bars 308 off of cart 306 and onto bars 302, which extend up to the die cutting station 10. Movement of cart 310 is continued until the cart reaches a predetermined index position in relation to the die station 10. At that point motor 326 is operated raising the lower pair of bars 316 into an abutting relationship with bars 116 on die station 10, as shown in FIGS. 13 and 14. If desired, suitable latching means, not shown, may be provided to lock the cart 310 in position on bars 302 and to latch bars 316 in an indexed relationship with bars 116, as shown in FIG. 13.

When cart 310 is positioned, as shown in FIG. 13, operation of the printing line is stopped. Then the force exerted through pressure wheels 60 and 62 is relieved by retracting the force applying portions of pressure wheel assemblies 56 and 58 as previously described. Clamps, not shown, are disengaged from rods 116 and the assembly of the die cylinder 14, bearing blocks 32 and slides 128 are moved horizontally out of the die cutting station 10 and onto rods 316 at the lower position on vertical supports 323. Suitable safety clamps, not shown, may then be engaged and motor 326 activated to lower vertical members 323 until the upper pair of rods 316 are in an abutting and cooperating relationship with bars 116 of die station 10. In this position, safety latches, not shown, are disengaged and the replacement die cylinder 14 and its associated assemblies are translated onto bars 116 of die station 10. The die assembly may then be positioned in the desired location with pressure wheel assemblies 56, 58 relocated and the force reapplied. The transfer is then complete.

At this point, operation of the printing line may be resumed. This complete changeover can be conducted in a matter of a few minutes, as opposed to greater than an hour required for the normal service and changeover of the die assembly on line. It will be appreciated that details of the placement of the drive motors, the drive train and frame structures, although not shown, have sufficient clearance to allow horizontal removal of the die cylinder 14. When the transfer is complete, the transfer cart 310 may be removed from its abutting relationship with die station 10 and transferred back onto cart 306. The cart 306 and transfer cart 310 may then be returned to a remote location. At the remote location the die cylinder 14 and die 80 may be serviced and readied for return to the printing operation for a subsequent job.

To changeover the print module 200, for example, if a different color ink is required for a new run, pressure is removed from cylinders 224, 232 and 246 to relax the adjustment of the sub-frame 204 in main frame 202 and of the impression cylinder 214 and Anilox cylinder 216. A suitable safety catch 285 is released and the entire sub-frame 204 is rolled out of the printing line along rails 210 and 302. Sub-frame 204 is transferred to the transfer cart 306 supported on rails 304. Yokes 226 are open, as shown, allowing cylinders 224 to disconnect quickly by relaxing the pressure in the cylinders. When on transfer cart 306, the sub-frame may then be serviced and readied for re-introduction into the printing line.

Once the first sub-frame unit 204 is removed, a subsequent sub-frame 204 and its associated assemblies car then be moved on a transfer cart 306, from a remote location, along rails 304 to a point adjacent rails 302 extending to the location of print station 200. That sub-frame 204 can then be transferred by hand off of the transfer cart 306 and moved off of rails 308 across rails 302 and into the print station 200 along rails 210. Once in position in print station 200, a suitable safety stop 285 is locked and cylinders 224 are engaged in yokes 226. Pressure is applied to cylinders 224 bringing the stop 228 to rest against main frame 202 and closing the clearance between sub-frame 204 and main frame 202. Movement of sub-frame 204 to rest position is only a few thousandths of an inch and is easily accommodated by the play of support frames 206 around rods 210.

Once the sub-frame 204 is engaged in frame 202, the adjustment of the print cylinder 214 against impression cylinder 212 may be made. The adjustment is made by first rotating cam 240 clockwise around shaft 272, as shown in FIG. 21, to a position where cam 272 extends beyond the plane of the end of screw indexing stops 238, to the right as shown in FIG. 21, and then activating cylinders 232 to move the L-shaped mount 213 and its contained assemblies to the left. Stop block 236 is then impinged against the cam 240. Shaft 272 is then rotated to rotate cam 240 in a counterclockwise direction, as shown in FIG. 21, which allows pressure cylinders 232 to positively engage stop blocks 236 against screw stops 238, without a machine damaging impact. The indexing and adjustment of the contact between the Anilox roll 216 and the plate cylinder 214 is conducted in the same manner as described for the contact between the plate cylinder 214 and the impression cylinder 212 using stops 250, 252 in a manner identical to that of stops 240, 238. With adjustment complete, sub-frame 204 and its assemblies are now in the machine and are ready for operation.

During operation, the contact between the plate cylinder 214 and impression cylinder 212 can be adjusted to increase or decrease the contact by joint operation of indexing screws 238 or to true up the contact by skewing the plate cylinder 214 by operating the indexing stops 238 individually. Screws 252 may be similarly used to manipulate the Anilox roll 216. During operation of the print station, the register of the print on the web 86 travelling across the impression cylinder 212 can be adjusted while running. By adjusting the circumferential relationship between print plate cylinder 214 and impression cylinder 212 using the lash adjustment driven by motor 291, as previously described.

It can thus be seen that applicant has provided a new mechanism for servicing the elements of a compound printer by rapidly changing over those elements in a manner that does not require any extensive down time and allows servicing of the elements of the printer to be conducted off line while the printer is in operation. Only a minimum of down time in replacing individual elements in the printing line is required. Transfer of the elements does not require power means since the roller bearing assemblies allow the elements to be quickly and easily moved by manually applied force.

It will be appreciated by one skilled in the art that the present invention may be used without using the exact embodiments disclosed herein for the purposes illustrated. Various modifications may be used in the specific structure disclosed, for example, the invention may be used on modules of the printing operation other than those specific embodiments disclosed, including roll feeding, punching or perforating operations as well as others, without departing from the spirit of the invention disclosed. The invention is to be limited only by the scope of the claims appended hereto.

What is claimed is:

1. In a station of a compound printer for processing a continuous web, the station having a frame and at least one cylinder mounted within said frame; means for rapid changeover of said cylinder, said rapid changeover means comprising:

bearing means mounting said cylinder within said frame for sliding transverse movement of said bearing means and cylinder in a direction parallel to the cylinder axis along a first track means, a cart having a main frame, bearing means supporting a replacement cylinder within said cart main frame for sliding transverse movement of said replacement cylinder in a direction parallel to the replacement cylinder axis along a second track means, said cart having a third track means for slidingly receiving said station cylinder, means for positioning said cart adjacent said station with said second track means parallel to said first track means and with said first and third track means in transverse alignment for the transverse sliding movement of said cylinder and its bearings from said first track means of said station and onto said third track means of said cart, and means for positioning said second track means in transverse alignment with said first track means for transverse sliding movement of said replacement cylinder and its bearings from said second track means of said cart onto said first track means of said station.

2. The rapid changeover means of claim 1 wherein the track means are sets of parallel rods and the bearing means have means to receive the parallel rods therein.

3. The rapid changeover means of claim 1 wherein said positioning means for positioning said second track means further comprise means for positioning said second and third track means relative the main frame of said cart.

4. The rapid changeover means of claim 3 wherein said cart further comprises a subframe, and means for adjusting the subframe relative said main frame, said second and third track means being mounted on said subframe in spaced parallel relation.

5. The rapid changeover means of claim 4 wherein said second and third track means are spaced apart vertically, and said subframe adjusts vertically relative said main frame.

6. The rapid changeover means of claim 1 wherein said main frame of said cart is mounted on rails for sliding movement of said cart for positioning adjacent said station.

7. The rapid changeover means of claim 1 wherein said station cylinder and replacement cylinder are die cutting cylinders.

8. The rapid changeover means of claim 1 further comprising means to fix the locations of said bearing means of said station cylinder on the first track means.

9. The rapid changeover means of claim 8 wherein the means to fix the location of the bearing means is a clamp means to tighten a portion of a bearing means against the first track means.

10. The rapid changeover means of claim 1 further comprising roller bearing means supporting the weight of said cylinders and bearing means for rolling engagement with said first track means.

11. The rapid changeover means of claim 1 wherein the station has means to urge the station cylinder into contact with said web, and means to rapidly retract said station cylinder from said contact.

12. The rapid changeover means of claim 11 wherein the urging means comprises means to adjustably vary the position of said urging means in a direction parallel to the station cylinder axis.

13. The rapid changeover means of claim 1 further comprising means for mounting said first track means for adjustment within said station frame toward and away from said web.

14. The rapid changeover means of claim 13 further comprising means for mounting said urging means within said station frame for adjusting toward and away from said cylinders.

* * * * *